(12) United States Patent
Coleman et al.

(10) Patent No.: US 11,232,021 B2
(45) Date of Patent: Jan. 25, 2022

(54) DATABASE RECORD LOCKING FOR TEST PARALLELIZATION

(71) Applicant: ServiceNow, Inc., Santa Clara, CA (US)

(72) Inventors: Matthew Robert Coleman, San Francisco, CA (US); Lauren Karina Choi, San Francisco, CA (US); Anson Barber Mayers, San Rafael, CA (US); Joel Rorik Fischer, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 258 days.

(21) Appl. No.: 16/401,938

(22) Filed: May 2, 2019

(65) Prior Publication Data
US 2020/0349062 A1  Nov. 5, 2020

(51) Int. Cl.
*G06F 11/00* (2006.01)
*G06F 11/36* (2006.01)
*G06F 16/23* (2019.01)

(52) U.S. Cl.
CPC ...... *G06F 11/3688* (2013.01); *G06F 11/3664* (2013.01); *G06F 16/2343* (2019.01)

(58) Field of Classification Search
CPC ............. G06F 11/3666; G06F 11/3668; G06F 11/3688
See application file for complete search history.

(56) References Cited

U.S. PATENT DOCUMENTS

| | | | |
|---|---|---|---|
| 5,832,484 A * | 11/1998 | Sankaran | G06F 16/2343 |
| 6,321,229 B1 | 11/2001 | Goldman | |
| 6,678,887 B1 | 1/2004 | Hallman | |
| 6,895,586 B1 | 5/2005 | Brasher | |
| 7,020,706 B2 | 3/2006 | Cates | |
| 7,027,411 B1 | 4/2006 | Pulsipher | |
| 7,337,290 B2 * | 2/2008 | Rajamani | G06F 9/524 711/163 |
| 7,392,300 B2 | 6/2008 | Anantharangachar | |
| 7,512,748 B1 * | 3/2009 | Mason | G06F 9/524 711/151 |
| 7,617,073 B2 | 11/2009 | Trinon | |
| 7,716,353 B2 | 5/2010 | Golovinsky | |
| 7,769,718 B2 | 8/2010 | Murley | |
| 7,770,064 B2 * | 8/2010 | Harper | G06F 11/2025 714/15 |

(Continued)

*Primary Examiner* — Elmira Mehrmanesh
(74) *Attorney, Agent, or Firm* — Fletcher Yoder PC

(57) ABSTRACT

A system includes software and a computing device configured to test the software in parallel. The computing device may obtain a first test case from a plurality of test cases. The first test case may be configured to cause the software to access a subset of data entries in a database. A plurality of locks facilitates exclusive access to the plurality of data entries. The computing device may further attempt to acquire a subset of the locks that correspond to the subset of the data entries. The computing device may further determine when to execute the first test case. Doing so involves either: (i) failing to acquire all of the subset of the locks and delaying execution of the first test case, or (ii) successfully acquiring all of the subset of the locks and executing the first test case in parallel with the second test case.

20 Claims, 10 Drawing Sheets

(56) References Cited

U.S. PATENT DOCUMENTS

| | | | |
|---|---|---|---|
| 7,840,940 B2 * | 11/2010 | Vertes | G06F 11/3476 |
| | | | 717/120 |
| 7,925,981 B2 | 4/2011 | Pourheidari | |
| 7,945,860 B2 | 5/2011 | Vambenepe | |
| 8,224,683 B2 | 7/2012 | Manos | |
| 8,402,127 B2 | 3/2013 | Solin | |
| 8,554,750 B2 | 10/2013 | Rangarajan | |
| 8,612,408 B2 | 12/2013 | Trinon | |
| 8,832,652 B2 | 9/2014 | Mueller | |
| 8,972,999 B2 * | 3/2015 | Li | G06F 9/524 |
| | | | 718/100 |
| 8,983,982 B2 | 3/2015 | Rangarajan | |
| 9,052,967 B2 * | 6/2015 | Gao | G06F 9/524 |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,755,012 B2 * | 8/2020 | Muthiah | G06F 30/30 |
| 2006/0218556 A1 * | 9/2006 | Nemirovsky | G06F 9/3851 |
| | | | 718/104 |
| 2007/0106667 A1 * | 5/2007 | Jain | G06F 16/2343 |
| 2007/0156939 A1 * | 7/2007 | Farchi | G06F 9/524 |
| | | | 710/200 |
| 2008/0209436 A1 * | 8/2008 | Agha | G06F 11/3688 |
| | | | 718/106 |
| 2008/0282244 A1 * | 11/2008 | Wu | G06F 9/524 |
| | | | 718/100 |
| 2009/0144706 A1 * | 6/2009 | Pastorelli | G06F 9/466 |
| | | | 717/128 |
| 2009/0307530 A1 * | 12/2009 | Tarta | G06F 11/3668 |
| | | | 714/38.14 |
| 2010/0064280 A1 * | 3/2010 | Zlotnick | G06F 11/3688 |
| | | | 717/124 |
| 2011/0295801 A1 * | 12/2011 | Dias | G06F 16/20 |
| | | | 707/622 |

* cited by examiner

802 — OBTAIN, BY A COMPUTING DEVICE, A FIRST TEST CASE FROM A PLURALITY OF TEST CASES, WHEREIN SOFTWARE IS CONFIGURED TO OPERATE IN A TESTBED ENVIRONMENT AND HAS ACCESS TO A PLURALITY OF DATA ENTRIES IN PERSISTENT STORAGE, WHEREIN THE COMPUTING DEVICE IS CONFIGURED TO TEST THE SOFTWARE IN PARALLEL, WHEREIN THE FIRST TEST CASE CAUSES THE SOFTWARE TO ACCESS A SUBSET OF THE DATA ENTRIES, AND WHEREIN A PLURALITY OF LOCKS RESPECTIVELY FACILITATE EXCLUSIVE ACCESS TO THE PLURALITY OF DATA ENTRIES, ONE LOCK PER ENTRY

804 — ATTEMPT, BY THE COMPUTING DEVICE, TO ACQUIRE A SUBSET OF THE LOCKS THAT CORRESPOND TO THE SUBSET OF THE DATA ENTRIES

806 — DETERMINE WHEN TO EXECUTE THE FIRST TEST CASE, WHEREIN THE DETERMINING INVOLVES EITHER: (I) FAILING TO ACQUIRE ALL OF THE SUBSET OF THE LOCKS AND RESPONSIVELY DELAYING EXECUTION OF THE FIRST TEST CASE, WHEREIN AT LEAST ONE OF THE SUBSET OF THE LOCKS HAS BEEN ACQUIRED BY A SECOND TEST CASE FROM THE PLURALITY OF TEST CASES, OR (II) SUCCESSFULLY ACQUIRING ALL OF THE SUBSET OF THE LOCKS AND RESPONSIVELY EXECUTING THE FIRST TEST CASE IN PARALLEL WITH THE SECOND TEST CASE

FIG. 8

DATABASE RECORD LOCKING FOR TEST PARALLELIZATION

BACKGROUND

Testing of large-scale, database-driven software applications may involve automated execution of tens of thousands or hundreds of thousands of individual test cases. Each test case may cause the software application to read from and/or write to a database as part of its activities, and then roll back any changes made to the database.

Given this large number of test cases, it is desirable to execute at least some extent of the test cases in parallel so that the overall time it takes to complete a test plan is reduced. In some environments, test parallelization can reduce this time from weeks to days, from days to hours, or from hours to minutes.

But database conflicts can limit such parallelization. For instance, if a particular test case modifies an entry in the database, other test cases that rely on this entry to have its original value may not produce the desired outcome when executed in parallel with the particular test case. There are a number of ways that this problem has been addressed, but all such solutions have drawbacks. For instance, complex test scheduling algorithms or testing in parallel on multiple physical testbeds both increase the amount of effort and cost associated with carrying out a test plan.

SUMMARY

The embodiments herein provide an improved technique of parallelizing test cases on a single testbed. By profiling test cases during an initial execution phase, the system can determine the database entries that each test case is designed to access or modify. Given this information, the system can schedule test cases to be carried out in a secondary execution phase. In this secondary phase, before each test case starts, the system attempts to acquire locks on all database entries that the test case relies on being in a default state. Each lock may effectively provide exclusive access to the entry while acquired. If all relevant locks are acquired, the test case is executed regardless of the number of other test cases executing in parallel. If not all locks are acquired, any acquired locks are released, execution of the test case is delayed for a period of time, and the system selects another test case for possible parallel execution according to this procedure. In this manner, test cases are executed in parallel so long as they do not conflict with each other. As a consequence, the time required to complete a test plan can be dramatically reduced without requiring complex scheduling of test cases or multiple testbeds.

Accordingly, a first example embodiment may involve a system including software configured to operate in a testbed environment and with access to persistent storage, such as a database. The persistent storage may contain a plurality of data entries. The system may further include a computing device configured to test the software in parallel by performing a set of operations. The operations may include obtaining a first test case from a plurality of test cases. The first test case causes the software to access a subset of the data entries, where a plurality of locks respectively facilitate exclusive access to the plurality of data entries, one lock per entry. The operations may additionally include attempting to acquire a subset of the locks that correspond to the subset of the data entries. Further, the operations may include determining when to execute the first test case. The determining may involve either: (i) failing to acquire all of the subset of the locks and responsively delaying execution of the first test case, where at least one of the subset of the locks has been acquired by a second test case from the plurality of test cases, or (ii) successfully acquiring all of the subset of the locks and responsively executing the first test case in parallel with the second test case.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

In a fifth example embodiment, a computer-implemented method may include obtaining, by a computing device, a first test case from a plurality of test cases, wherein software is configured to operate in a testbed environment and has access to a plurality of data entries in persistent storage, wherein the computing device is configured to test the software in parallel, wherein the first test case causes the software to access a subset of the data entries, and wherein a plurality of locks respectively facilitate exclusive access to the plurality of data entries, one lock per entry. The computer-implemented method may further involve attempting, by the computing device, to acquire a subset of the locks that correspond to the subset of the data entries. The computer-implemented method may further involve determining when to execute the first test case, wherein the determining involves either: (i) failing to acquire all of the subset of the locks and responsively delaying execution of the first test case, wherein at least one of the subset of the locks has been acquired by a second test case from the plurality of test cases, or (ii) successfully acquiring all of the subset of the locks and responsively executing the first test case in parallel with the second test case.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a flow chart, in accordance with example embodiments.

DETAILED DESCRIPTION

Figure 1:
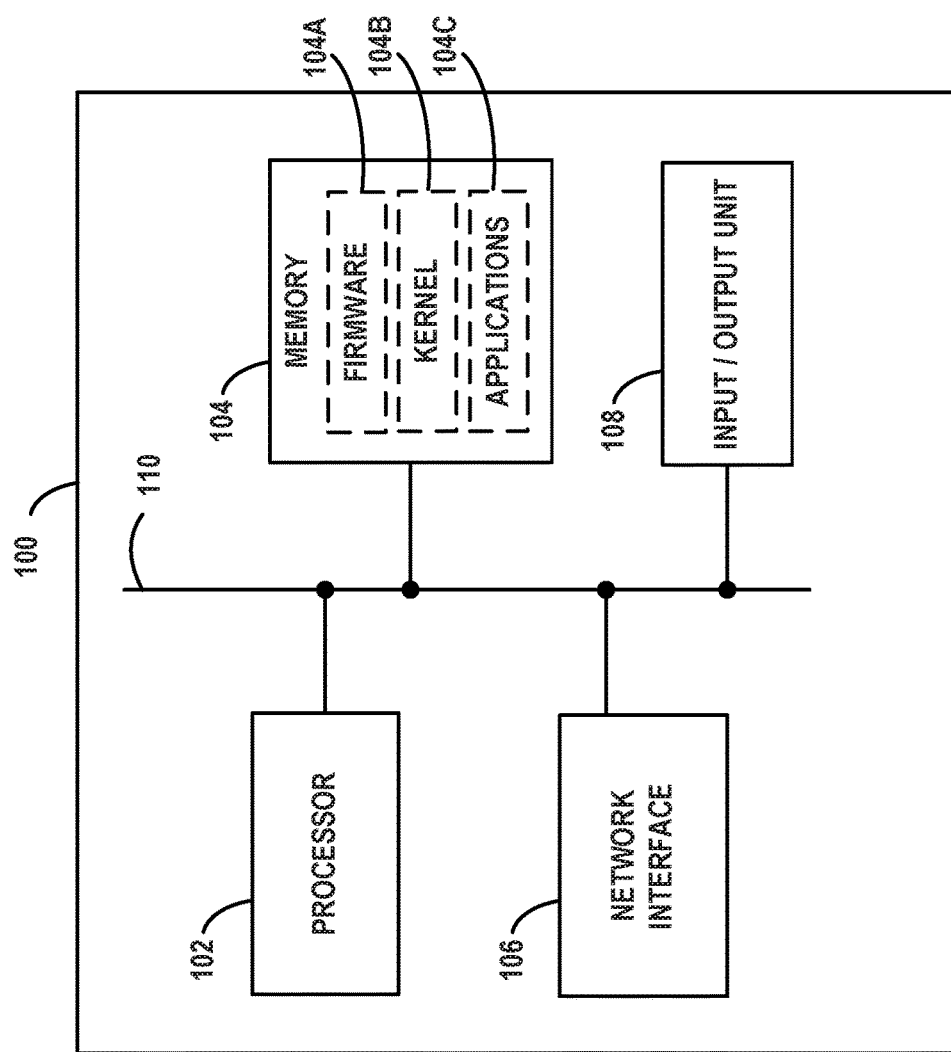
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
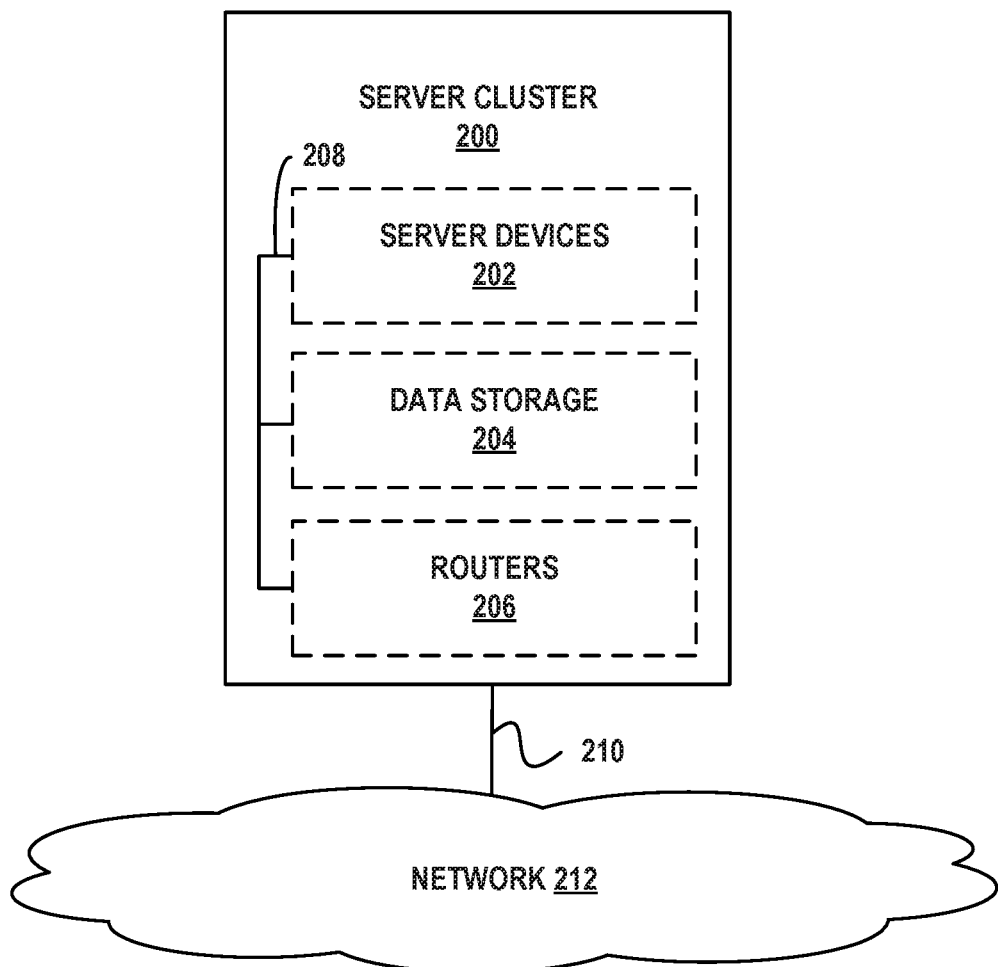
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
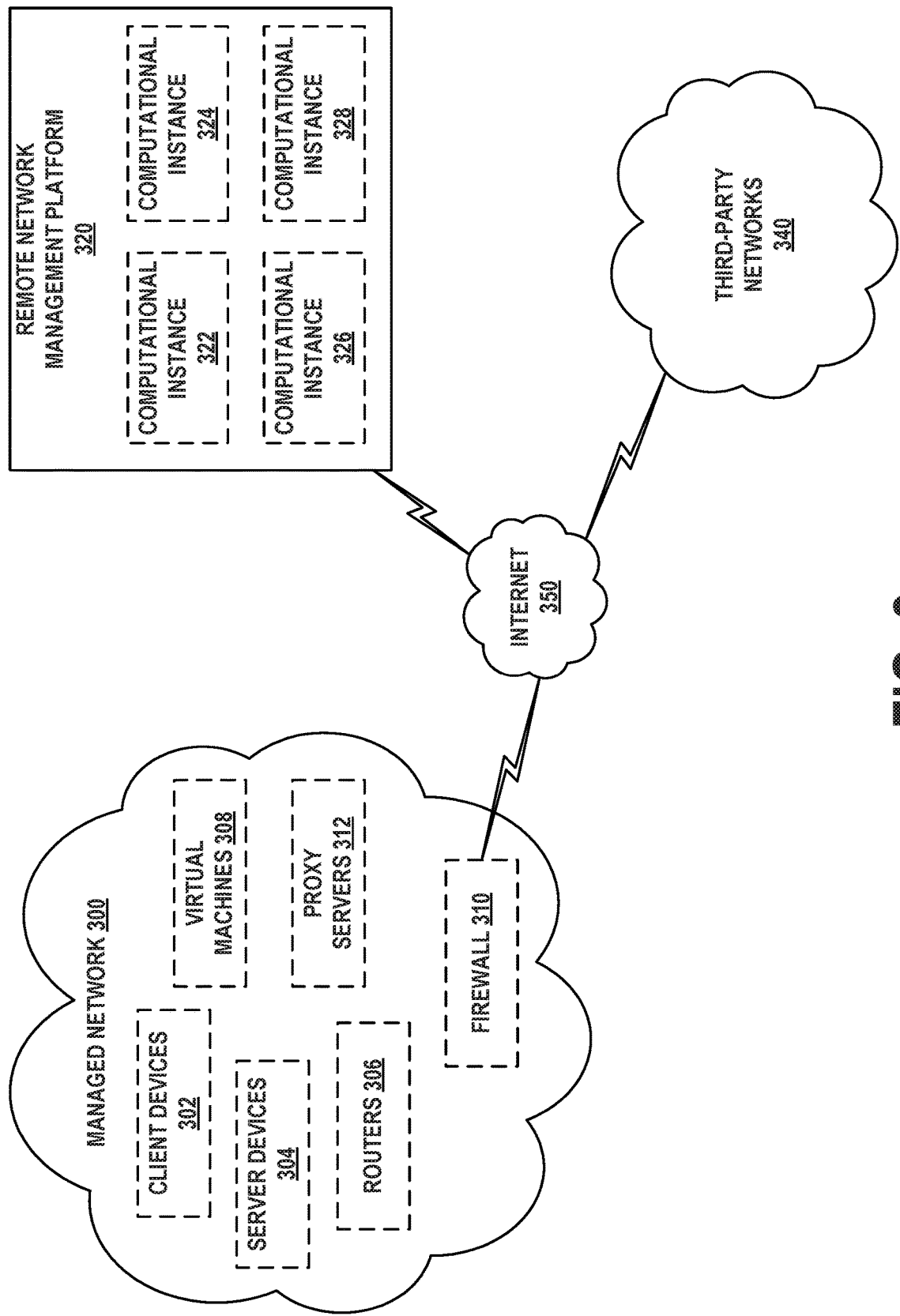
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
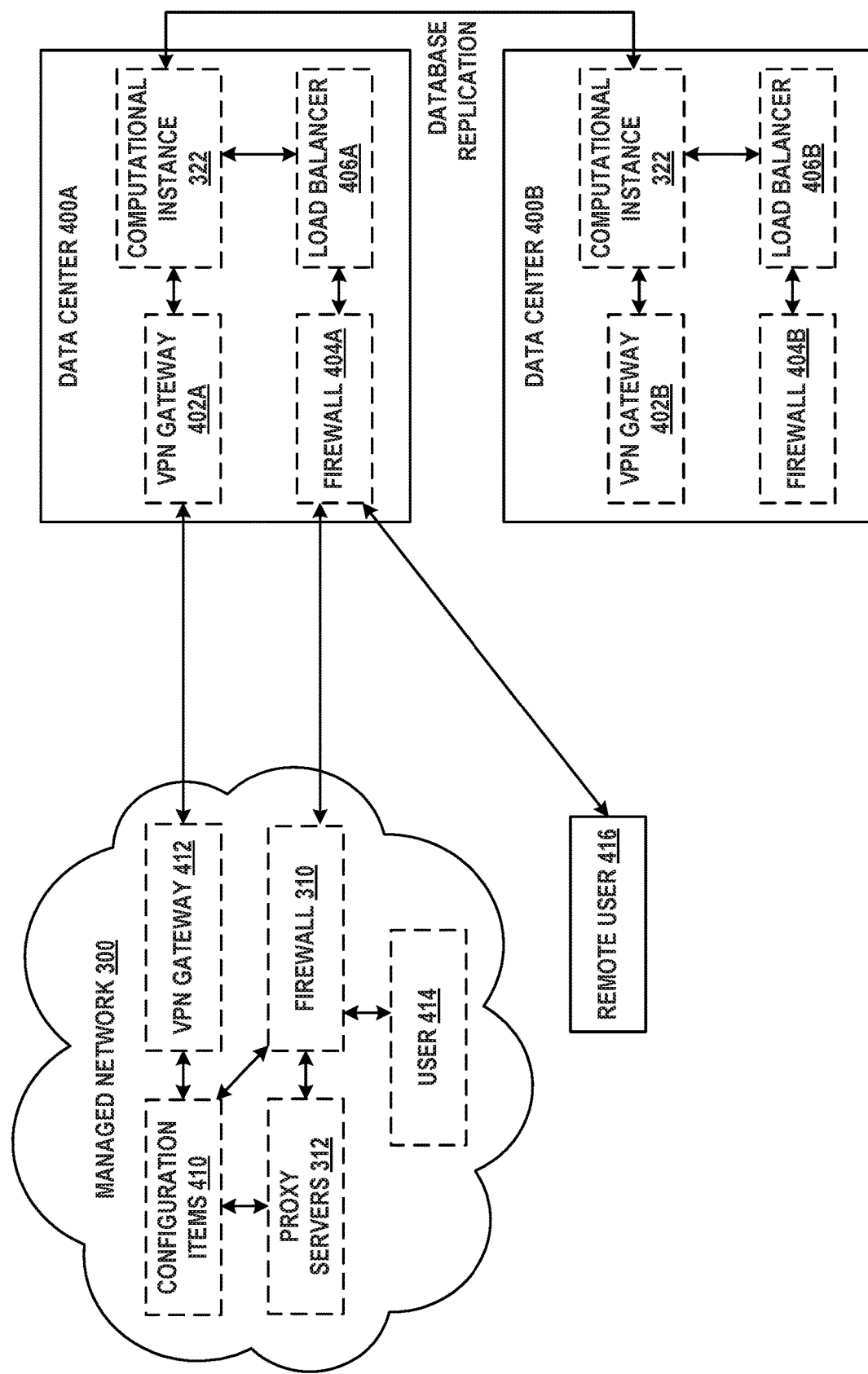
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-

10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
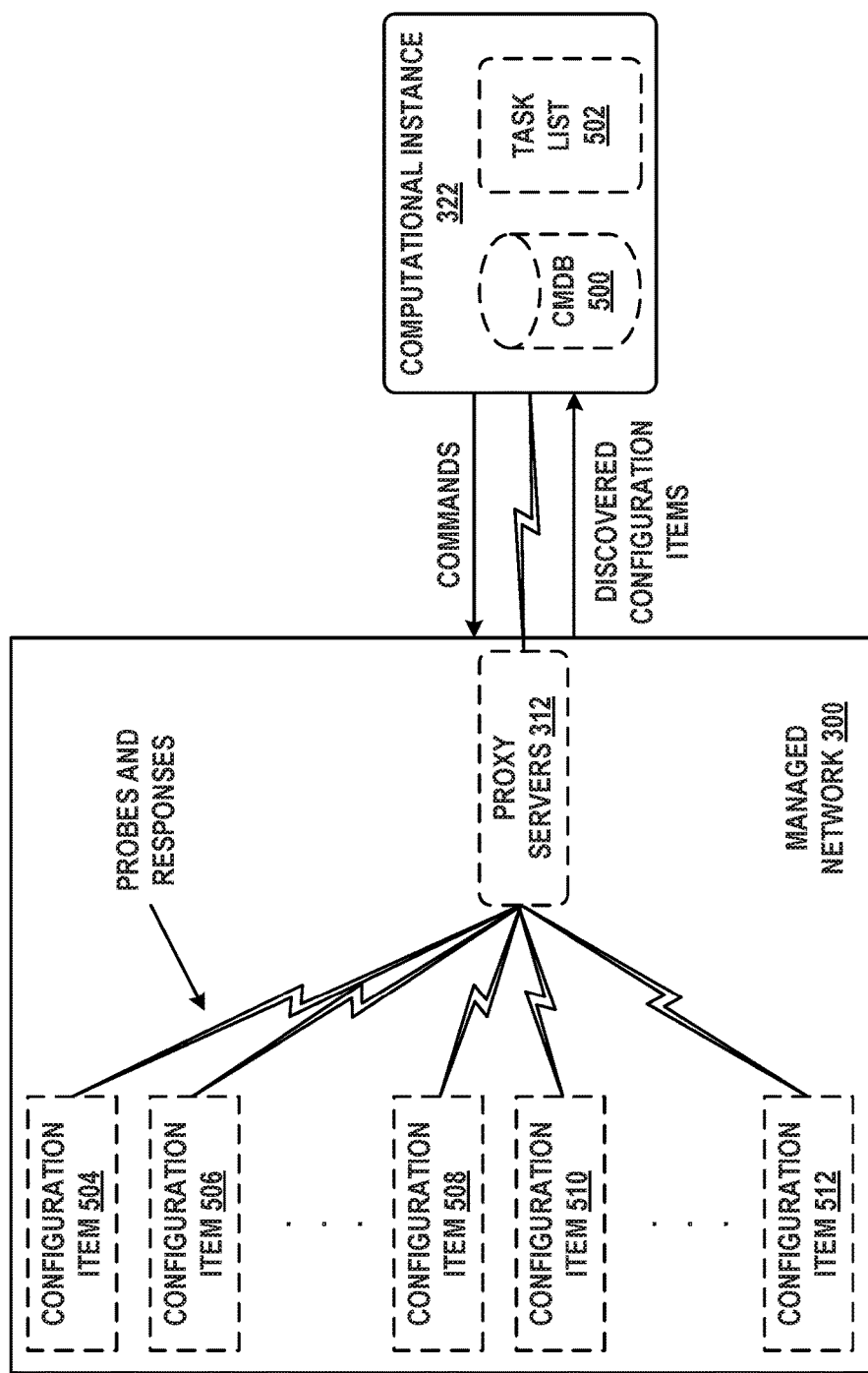
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
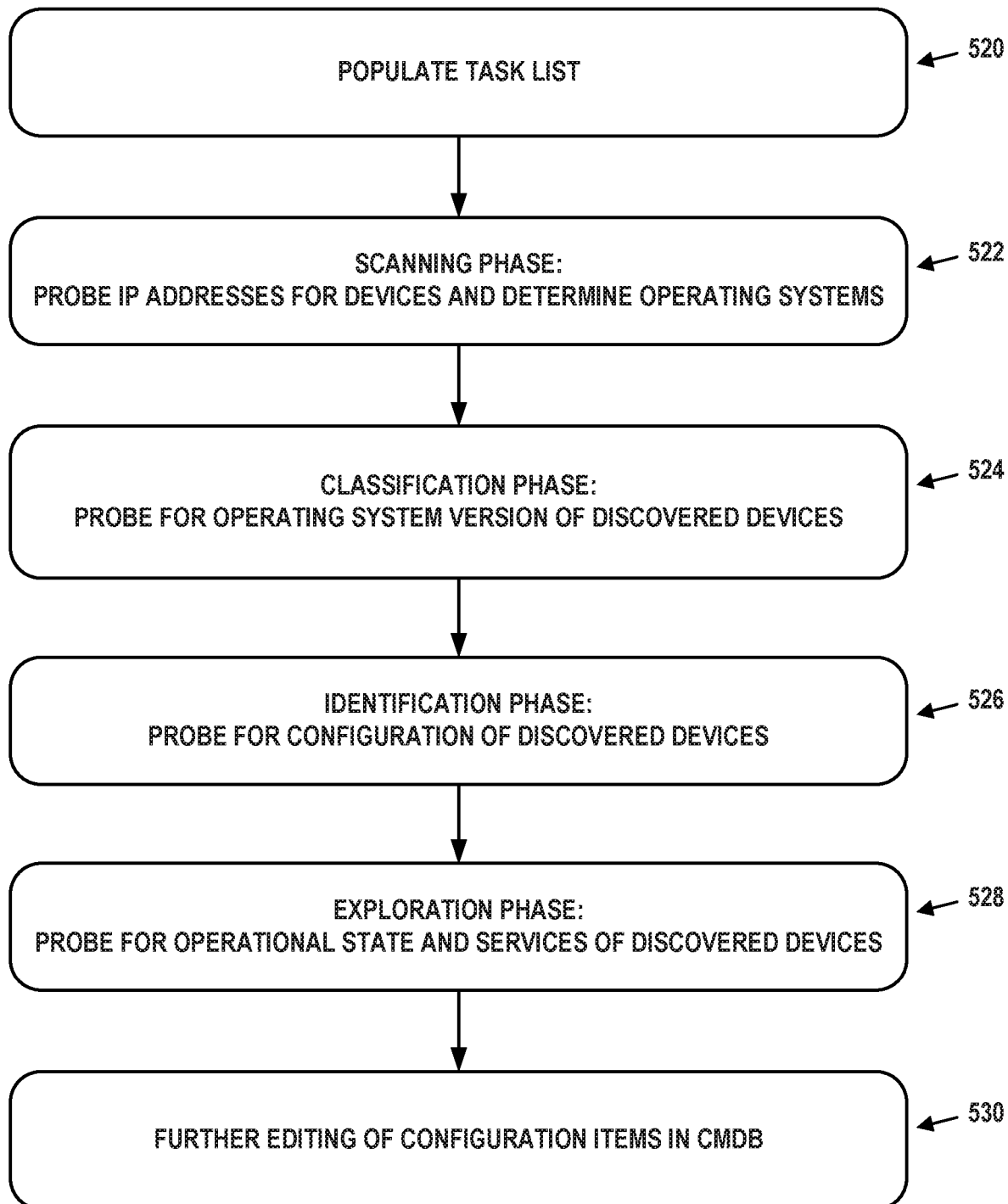
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE TESTING SYSTEM

In order to implement new software or software upgrades to remote network management platform software, a series of test cases may be run on the constituent software. Each test case may cause the remote network management platform software to read from and/or write to a database as part of its activities. Given that a large number of test cases (perhaps tens or hundreds of thousands) may be part of a test plan for the remote network management platform software, it is desirable to execute at least some of these test cases in parallel. In this way, overall testing time can be reduced dramatically.

However, two test cases executing concurrently and attempting read and/or modify the same data entry may cause one or both to produce inconsistent or inaccurate test case results. For example, if two test cases executed in parallel both write to the same data entry within the database, the outputs of the test cases may vary depending upon which test case writes to the data entry first.

As a consequence, even though the remote network management platform software may be properly designed and implemented to pass these test cases when the test cases are executed serially, parallel execution may indicate that the remote network management platform software exhibits an error. Test engineers would then have to waste time attempting to determine the root cause of this error, only to realize that it was an artifact of the parallel testing.

This inaccuracy and/or inconsistency of test case results may be avoided by a system that utilizes test case scheduling according to availability of locks which correspond to data entries test cases access during testing. This system may also eliminate the burden from the test designer to specifically design test cases to run concurrently with other test cases. Accordingly, this system may allow for safer execution of independent actions in a multi-threaded environment.

In particular, the system involves a two-phase approach to testing. In the first phase, test cases are executed serially or in parallel to determine which data entries they access. In the second phase, test cases that do not access the same data entries are executed in parallel. The locks facilitate this parallel testing.

A. Serial Execution of Test Cases

Figure 6A:
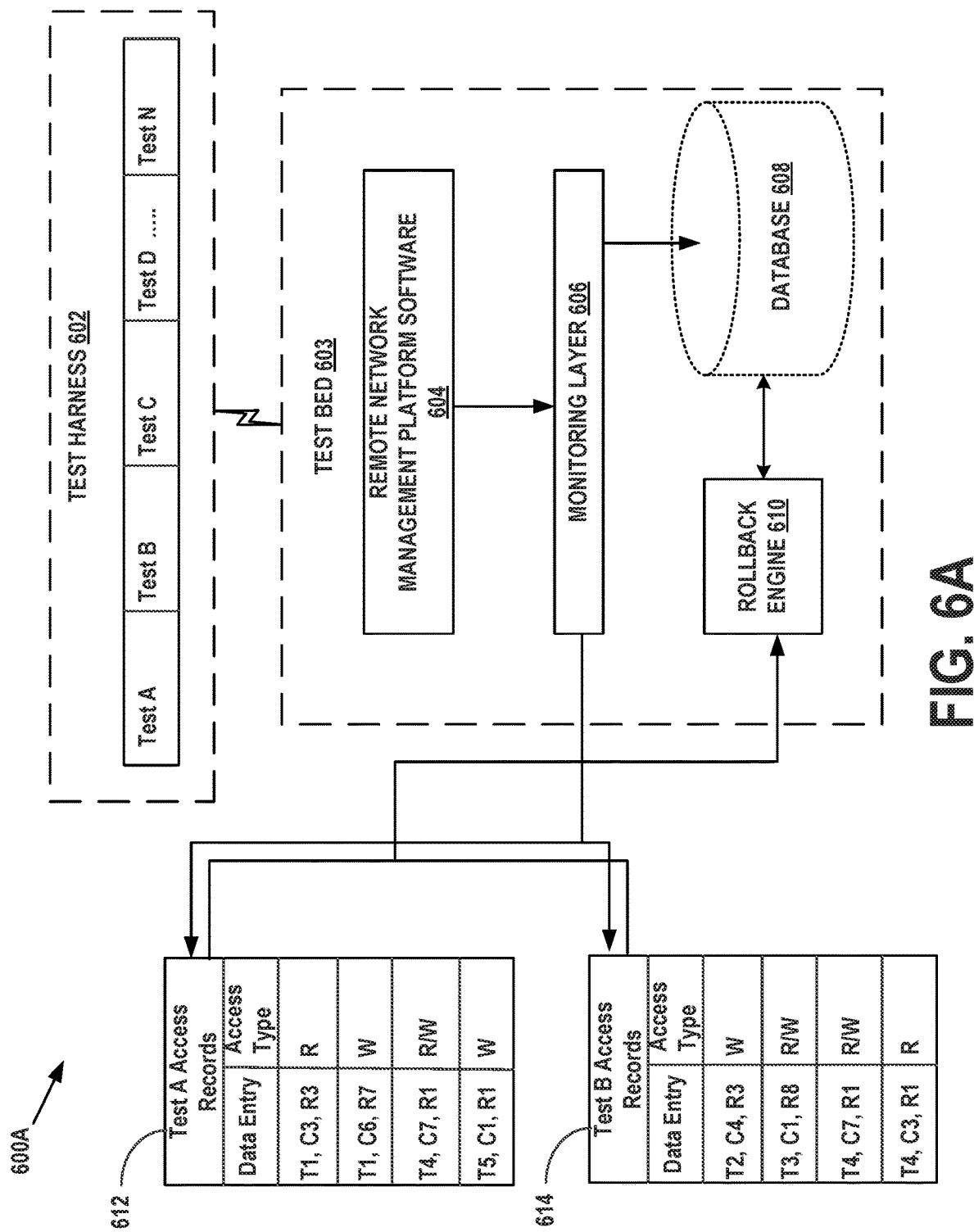
FIG. 6A depicts a testing system, in accordance with example embodiments.

FIG. 6A depicts an example testing system 600A configured for serial execution of test cases. As noted above, serial testing of each test case may be performed prior to parallel testing to determine how each test case interacts with data entries in persistent storage (i.e., database 608). Namely, serial testing of each test case may determine which data entries within database 608 an individual test case accesses and the type of access (e.g., read, write, or read and write).

The testing system 600A may include a test harness 602 configured to access a test bed 603. In some examples the test harness 602 may be a computer. In other examples, the test harness 602 may be a cluster of computers. Further, in some examples the test bed 603 may be a computer. In other examples, the test bed 603 may be a cluster of computers. For example, test bed 603 may replicate a production deployment of computational instance 322.

In example embodiments, the test harness 602 has access to test cases (e.g., Test A, Test B, Test C, Test D . . . Test N). A test case may be a specification of inputs, execution conditions, testing procedure, and/or expected results to be executed to achieve a particular software testing objective. For example, a test case may be employed for testing that accessing a webpage or web application provides a desired output (e.g., specific HTML content formatted in a particular fashion). Embodiments may include any number of test cases that make up a test plan.

In some example embodiments, the test bed 603 contains or has access to remote network management platform software 604, monitoring layer 606, database 608, and a rollback engine 610. Database 608 includes a plurality of data entries which may be accessed by the remote network management platform software 604. In some examples involving relational databases, each data entry may be identified by a table, column, and row within database 608. In other types of databases, entries may be defined in different ways.

Using testing system 600A, each test case may be run serially to determine which data entries, within database 608, the test case accesses. This may, for example, be done during or after the development of the test case. In alternative embodiments, test cases may be run in parallel to determine which data entries, within database 608, the test cases access.

Thus, the test bed 603 may obtain a test case to run serially (e.g., Test A). Once obtained, the selected test case may cause the remote network management platform software 604 to access one or more data entries within database 608. In alternative embodiments, the test bed 603 may obtain a test case to run in parallel during this first phase.

The monitoring layer 606 may be included within the test bed 603 and may create access records 612, 614 according to data entries accessed each test case. For example, each read and write request from the remote network management platform software 604 (where the write requests include create, update, and delete requests) may pass through the monitoring layer 606 before reaching database 608. In this way, the monitoring layer 606 can record information about the data access. Thus, the monitoring layer 606 may be disposed as a proxy between the remote network management platform software 604 and database 608. The access records 612, 614 may include the access type for each data entry based on the type of access observed by the monitoring layer 608. In some instances, the test case may read from a data entry. Alternatively, in another instance, the test case may write to a data entry. In yet another instance, the test case may both read from and write to the data entry.

In access records 612, 614, data entries may be identified by table, column and row. For example, T1, C2, R3 represents a data entry at table 1, column 2, row 3 of database 608. Further, Test A may access four data entries during serial testing: T1, C3, R3; T1, C6, R7; T4, C7, R1; and T5, C1, R1. The monitoring layer 606 may create access record 612 identifying each data of these four data entries. Additionally, access record 612 may include the access types for each data entry. In FIG. 6A, access record 612 includes whether Test A reads from the data entry (R), writes to the data entry (W), or both reads from and writes to the data entry (R/W).

Further, Test B may access four data entries during serial testing: T2, C4, R3; T3, C1, R8; T4, C7, R1; and T4, C3, R1. The monitoring layer 606 may create access record 614 identifying each data of these four data entries. Additionally, access record 614 may include the access types for each data entry. Access record 614 also includes whether Test B reads from the data entry (R), writes to the data entry (W), or reads from and writes to the data entry (R/W). The monitoring layer 606 may repeat this process for each test case during serial testing.

Further, in some examples, rather than using a monitoring layer 606, a test case developer may manually create access records during development of the test cases. For example, during development of a test case, the test case developer may indicate which data entries the test case access and the access types for each data entry. These access records may be associated with the corresponding test case in the test harness 602. While this manual access record development is possible, it is preferable to include a monitoring layer 606. Namely, the manually created access records may be inaccurate and may need to be recreated when a test case is changed or updated. Conversely, serial testing with the monitoring layer 606 may be performed any time a test case is updated and may decrease the potential for errors.

In some example embodiments, once serial testing is completed for each test case, the rollback engine 610 may revert the data entries that have changed during the serial execution of the test case from their respective new states to their respective initial states. For example, after serial execution of Test A, the rollback engine 610 may revert each data entry to which Test A wrote (i.e., data entries T1, C6, R7; T4, C7, R1; and T5, C1, R1) to each data entry's state prior to execution of Test A.

In some examples, the rollback engine 610 may have access to a copy of the initial state of each of the data entries within the database 608. In alternate examples, the monitoring layer 606 may record an initial state of the data entries written during execution of each test case (e.g., by intercepting a write request to a data entry, reading and storing a copy of the data entry, then carrying out the write of the data entry). After execution of a test case, the rollback engine 610 may revert any data entries that the test case writes to back to their initial states based on this information.

B. Parallel Testing and Data Entry Locking

Figure 6B:
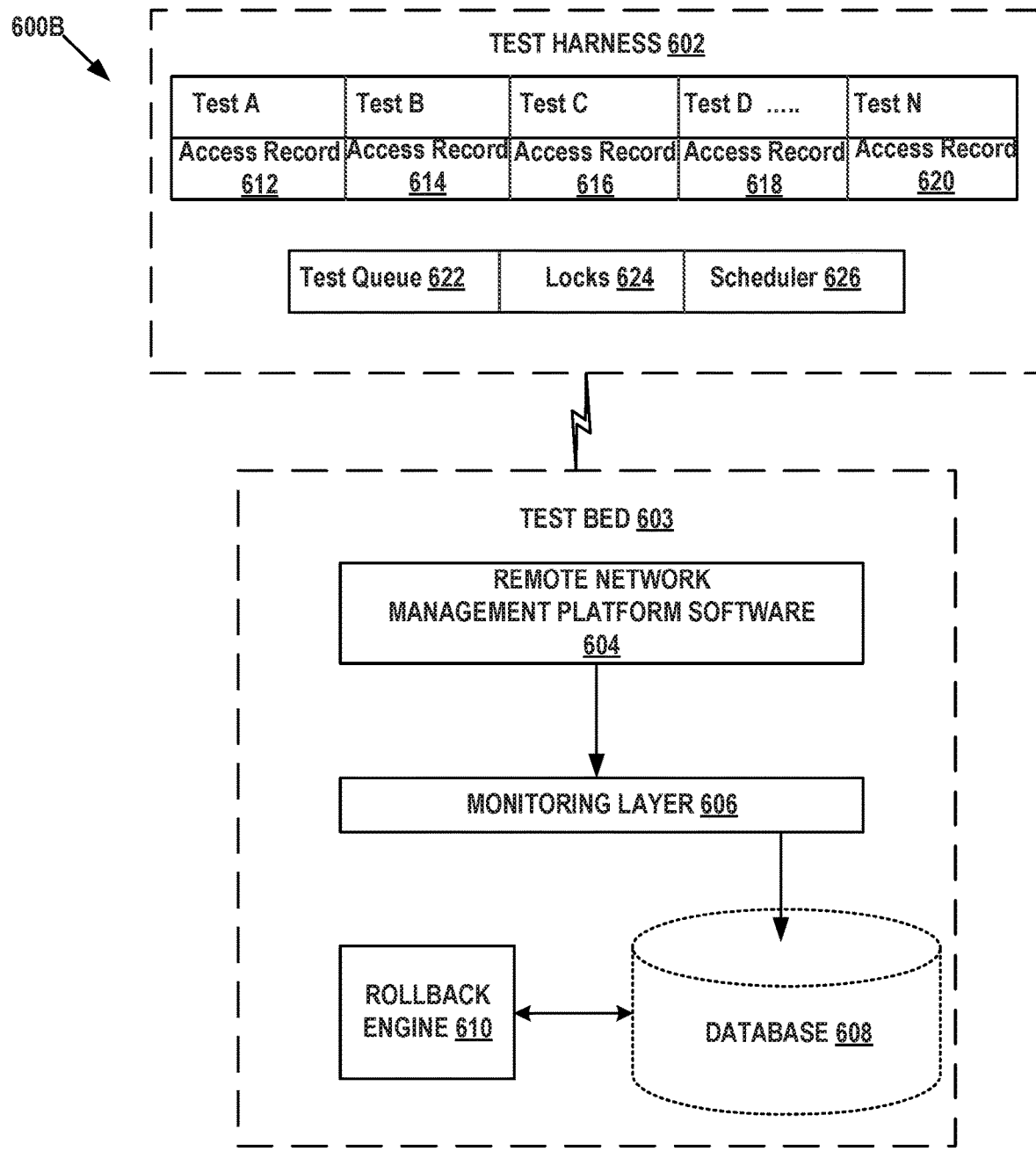
FIG. 6B depicts a testing system, in accordance with example embodiments.

FIG. 6B shows a testing system 600B configured for parallel testing of test cases. Parallel testing may be performed after initial serial or parallel execution of test cases. Test cases may be executed in parallel so that they do not write to or, in some embodiments, read from the same data entries as other test cases being executed concurrently. This results in consistent and accurate test case results during parallel testing by avoiding the parallel execution of test cases that conflict with one another with respect to accessing the data entries. Further, each test case may be run many times in parallel for integration, load and/or soak testing, thus mitigating the overhead of any initial serial or parallel execution.

An example testing system 600B may also include test harness 602 and test bed 603. Each test case may be associated with the corresponding access record developed during serial execution. As described previously, an access record refers to the data entries an individual test case accessed during serial testing. For example, Test A is associated with access record 612, Test B is associated with access record 614, Test C is associated with access record 616, Test D is associated with access record 618, and Test N is associated with access record 620. The test harness 602 may have access to any number of test cases that make up a test plan.

Further, in some embodiments, the test harness 602 may include a test queue 622, locks 624, and a scheduler 626. The test queue 622 may represent an ordering for initiating execution of the test cases. In some examples, the test queue 602 may be a first in, first out (FIFO) queue. For example, the order of test cases in test queue 602 may be Test A, Test B, Test C, Test D . . . and Test N. This means that the test harness 602 will initiate execution of Test A if Test A is deemed to be able to execute in parallel with any other executing test cases, then initiate execution of Test B if Test B is deemed to be able to execute in parallel with Test A and any other executing test cases, and so on.

Other examples are possible, including ordering the test cases according to an assigned priority. For example, each test case may be assigned a priority status, such as high, medium, or low. The test queue 622 may develop a high priority list including all the high priority test cases, a medium priority list including all the medium priority test cases, and a low priority list including all the low priority test cases. The test queue 622 may then access all of the test cases in the high priority list before moving to the test cases in the medium and low priority lists.

In parallel execution, the test harness 602 may retrieve the test cases from the head of the test queue 622 and attempt to acquire a subset of locks 624 associated with the corresponding access record. In some embodiments, locks 624 may facilitate exclusive access to data entries. In some embodiments, there is one lock associated with every data entry within the database 608, or one lock per data entry accessed by at least one test case. Locks 624 may be used to prevent two or more test cases that access the same entry from running in parallel. In some examples, locks 624 may be binary locks, such as a mutex or semaphore. Other examples are possible.

During parallel testing, the scheduler 626 may attempt to acquire a series of locks associated with the data entries that the test case will access prior to execution. If a test case fails to acquire all of the desired locks the test case may not be executed, and the scheduler 626 may place the test case back in the test queue 622 for execution at a later time. In this way, locks 624 may prevent two test cases that require access to the same data entry from running in parallel. Use of such a locking system allows the test cases to work cooperatively during parallel testing such that only one test case may access and/or modify a data entry at any given point in time.

In some example embodiments, the test case may only attempt to acquire locks for data entries to which the particular test case writes. In these cases, the results of the test case may not be substantially dependent upon the contents of a data from which it reads. For example, for Test A, the remote network management platform software 604 may only attempt to acquire locks for data entries T1, C6, R7; T4, C7, R1; and T5, C1, R1. In these examples, the value or values of data entries to which the test case reads from may not affect the results of the test case. For example, the Test A may read from data entry T1, C3, R3 to determine whether or not the data entry contains a value or to display this value, rather than use the actual value of data entry T1, C3, R3. Thus, if another test case modifies data entry T1, C3, R3 during execution in parallel with Test A, the results of Test A will not be affected.

In different embodiments, Test A may cause the scheduler 626 to attempt to acquire any lock which the particular test case accesses, even if just to read from the data entry. For example, for Test A, the scheduler 626 may attempt to acquire locks for data entries T1, C3, R3; T1, C6, R7; T4, C7, R1; and T5, C1, R1. In these examples, the results of Test A may be dependent upon all data entries in which it accesses.

Acquiring a lock may involve a process or thread identifier being associated with the lock. For example, the lock may be implemented as an integer with a value of 0 signifying that the lock has not been acquired. Before execution of Test A, Test A may attempt to acquire the locks associated with each of the data entries in access record 612 (i.e., T1, C3, R3; T1, C6, R7; T4, C7, R1; and T5, C1, R1). If each of the locks associated with these data entries has not already been acquired by another test case (i.e., each lock has a value of 0), the scheduler 626 may create or launch a process or thread for executing Test A and write the process identifier or thread identifier to all of these locks in order to acquire them.

In some example embodiments, the test case may fail to acquire all of the locks corresponding to its access record. The test case may then release any locks it successfully acquired to make the locks available for other test cases. The scheduler 626 may then delay execution of the test case by placing the test case back into the test queue 622. In some examples where the test queue 622 is a FIFO queue, the scheduler 626 may, for example, place the test case at the tail of the test queue 622 and select a new test case from the head of the test queue 622 for possible execution. This process may be repeated until all the test cases have been executed (i.e., there are no test cases left in the test queue 622). Many other examples are possible.

In examples where all of the locks for a given test case are successfully acquired, the test case may be executed in parallel with a number of other test cases. For example, Test A and Test C may run in parallel, provided all of the locks required to execute Test A are different than all of the locks required to execute Test C. This process may be repeated for any number of test cases, such that multiple test cases may be executed in parallel with each other. There may be a configured upper limit on the number of test cases running in parallel (e.g., 4, 6, 8) based on the processing and storage capabilities of test harness 602.

Alternatively, in some example embodiments, all of the locks may fail to be acquired for a particular test case. As shown in FIG. 6A, both Test A and Test B may write to data entry T4, C7, R1. If Test A has acquired the lock for data entry T4, C7, R1, Test B may fail to acquire the lock for data entry T4, C7, R1. In response to failing to acquire all the subset of the locks required for Test B, the scheduler 626 may delay execution of Test B so that Test B may eventually be executed at a later point in time when it has exclusive access to the associated data entries. As described previously, this reduces the possibility of inconsistent test case results and/or errors in test case execution. For example, the scheduler 626 may place Test B at the tail of the test queue 622 and select another test case from the head of the test queue 622.

After a test case has been successfully executed, the test case may release all acquired locks allowing other test cases to acquire these locks.

Figure 7:
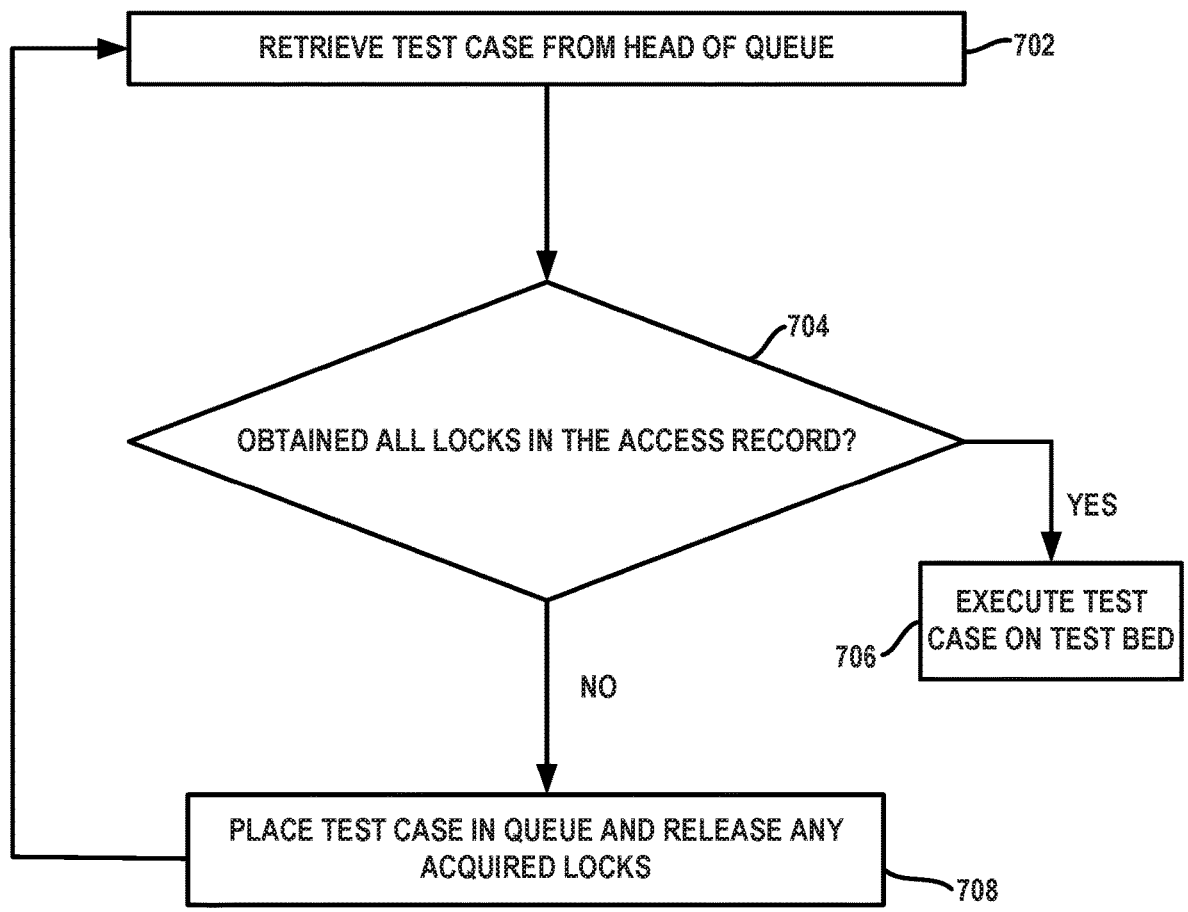
FIG. 7 depicts a flow diagram illustrating a parallel testing system process, in accordance with example embodiments.

FIG. 7 depicts a flow diagram illustrating a parallel testing system process 700, as shown in FIG. 6B. The process may begin at step 702, which involves the scheduler retrieving a test case from the head of the test queue.

At step 704, the scheduler may then attempt to obtain all locks corresponding to the data entries in the access record associated with the test case. The data entries may have been identified during initial serial or parallel testing, as described previously.

At step 706, if the scheduler successfully acquires all the locks corresponding to the data entries identified in the access record, the test case may be executed on the test bed, possibly in parallel with one or more other test cases.

Alternatively, at step 708 if the scheduler fails to acquire all the locks corresponding to the data entries identified in the access record, the scheduler may release any acquired locks and may delay execution of the test case by placing the test case back in the test queue. For example, the scheduler may place the test case at the tail of the test queue. This process may be repeated until all the test cases have been executed (i.e., there are no test cases remaining in the test queue).

VI. EXAMPLE OPERATIONS

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 802 may include obtaining a first test case from a plurality of test cases, wherein the first test case causes software to access a subset of data entries, and wherein a plurality of locks respectively facilitates exclusive access to the plurality of data entries, one lock per entry.

Block 804 may include attempting to acquire a subset of the locks that correspond to the subset of the data entries.

Block 806 may include determining when to execute the first test case, wherein the determining involves either: (i) failing to acquire all of the subset of the locks and responsively delaying execution of the first test case, wherein at least one of the subset of the locks has been acquired by a second test case from the plurality of test cases, or (ii) successfully acquiring all of the subset of the locks and responsively executing the first test case in parallel with the second test case.

In some embodiments where the computing device delayed execution of the first test case, the operations may further include, after delaying execution, attempting to acquire the subset of the locks, and successfully acquiring all of the subset of the locks and responsively executing the first test case.

In some embodiments where the computing device delayed execution of the first test case, the operations may further include obtaining a third test case from the plurality of test cases, wherein the third test case causes the software to access a second subset of the data entries, attempting to acquire a second subset of the locks that correspond to the second subset of the data entries, and determining when to execute the third test case. This determining involves either: (i) failing to acquire all of the second subset of the locks and responsively delaying execution of the third test case, wherein at least one of the second subset of the locks has been acquired by the second test case, or (ii) successfully acquiring all of the second subset of the locks and responsively executing the third test case in parallel with the second test case.

In some embodiments, test cases may be executed in parallel. In these cases, prior to executing the software in parallel the computing device may be configured to begin serial execution of the first test case, and during the serial execution of the first test case, record all data entries accessed by the software to form the subset of data entries. In these embodiments, a monitoring layer may be disposed between the software and the persistent storage and configured to perform the recording of all data entries accessed by the software. Further, recording accesses to all the data entries may include recording references to respectively accessed database tables, columns with the database tables and rows within the database tables as the data entries.

In some embodiments where the serial execution of the first test case causes at least some of the subset of data entries to change from respective initial states to respective new states, the further operations may comprise, after the serial execution of the first test case has ended, reverting the data entries that have changed from their respective new states to their respective initial states.

In some embodiments, the software accessing the subset of the data entries comprises the software reading from or writing to each of the subset of data entries, such that the locks provide exclusive read and write access to the plurality of data entries.

In some embodiments, obtaining the first test case from the plurality of test cases involves removing the first test case from a head of the queue, and delaying execution of the first test case involves placing the first test case at a tail of the queue.

In some embodiments, the software accessing the subset of the data entries includes the software reading from or writing to each of the subset of data entries, such that the locks facilitate exclusive read and write access to the plurality of data entries. Alternatively, the software accessing the subset of the data entries includes the software writing to each of the subset of data entries, such that the locks facilitate exclusive write access to the plurality of data entries.

In some embodiments, the software represents at least part of a remote network management platform that includes one or more computational instances, where each of the computational instances is configured to be dedicated to a respective network

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   software configured to operate in a testbed environment and with access to persistent storage, wherein the persistent storage contains a plurality of data entries; and
   a computing device configured to test the software in parallel by performing operations comprising:
      obtaining a first test case from a plurality of test cases, wherein the first test case causes the software to access a subset of the data entries, and wherein a plurality of locks respectively facilitate exclusive access to the plurality of data entries, one lock per entry;
      attempting to acquire a subset of the locks that correspond to the subset of the data entries;
      determining when to execute the first test case based on whether all of the subset of the locks have been acquired, wherein at least one of the subset of the locks has been acquired by a second test case from the plurality of test cases; and
      executing the first test case in parallel with the second test case in response to acquiring all of the subset of locks.

2. The system of claim 1, wherein the operations comprise:
   delaying execution of the first test case in response to failing to acquire all of the subset of locks;
   after delaying execution of the first test case, obtaining the first test case;
   attempting to acquire the subset of the locks; and
   successfully acquiring all of the subset of the locks and responsively executing the first test case.

3. The system of claim 1, wherein the operations comprise:
   delaying execution of the first test case in response to failing to acquire all of the subset of locks;
   obtaining a third test case from the plurality of test cases, wherein the third test case causes the software to access a second subset of the data entries;
   attempting to acquire a second subset of the locks that correspond to the second subset of the data entries; and
   determining when to execute the third test case, wherein the determining involves either: (i) failing to acquire all of the second subset of the locks and responsively delaying execution of the third test case, wherein at least one of the second subset of the locks has been acquired by the second test case, or (ii) successfully acquiring all of the second subset of the locks and responsively executing the third test case in parallel with the second test case.

4. The system of claim 1, wherein prior to testing the software in parallel, the operations comprise:

beginning serial execution of the first test case; and during the serial execution of the first test case, recording all data entries accessed by the software to form the subset of the data entries.

5. The system of claim 4, wherein the serial execution of the first test case causes at least some of the subset of the data entries to change from respective initial states to respective new states, wherein the operations comprise:

after the serial execution of the first test case has ended, reverting the data entries that have changed from their respective new states to their respective initial states.

6. The system of claim 4, comprising a monitoring layer disposed between the software and the persistent storage and configured to record the data entries accessed by the software.

7. The system of claim 4, wherein the persistent storage contains database tables, and wherein recording all data entries accessed by the software to form the subset of the data entries comprises:

recording references to respectively accessed database tables, columns within the database tables and rows within the database tables as the data entries.

8. The system of claim 1, wherein the computing device has access to a queue of test cases, wherein obtaining the first test case from the plurality of test cases comprises removing the first test case from a head of the queue, and wherein delaying execution of the first test case comprises placing the first test case at an end of the queue.

9. The system of claim 1, wherein the software accessing the subset of the data entries comprises the software reading from or writing to each of the subset of the data entries, such that the locks facilitate exclusive read and write access to the plurality of data entries.

10. The system of claim 1, wherein the software accessing the subset of the data entries comprises the software writing to each of the subset of the data entries, such that the locks only facilitate exclusive write access the plurality of data entries.

11. The system of claim 1, wherein the software represents at least part of a remote network management platform that includes one or more computational instances, wherein each of the computational instances is configured to be dedicated to a respective network.

12. A computer-implemented method comprising:

obtaining, by a computing device, a first test case from a plurality of test cases, wherein software is configured to operate in a testbed environment and has access to a plurality of data entries in persistent storage, wherein the computing device is configured to test the software in parallel, wherein the first test case causes the software to access a subset of the data entries, and wherein a plurality of locks respectively facilitate exclusive access to the plurality of data entries, one lock per entry;

attempting, by the computing device, to acquire a subset of the locks that correspond to the subset of the data entries;

determining when to execute the first test case based on whether all of the subset of the locks have been acquired, wherein at least one of the subset of the locks has been acquired by a second test case from the plurality of test cases; and executing the first test case in parallel with the second test case in response to acquiring all of the subset of locks have been acquired.

13. The computer-implemented method of claim 12, comprising:

delaying execution of the first test case in response to failing to acquire all of the subset of locks;

after delaying execution of the first test case, obtaining the first test case;

attempting to acquire the subset of the locks; and successfully acquiring all of the subset of the locks and responsively executing the first test case.

14. The computer-implemented method of claim 12, comprising:

delaying execution of the first test case in response to failing to acquire all of the subset of locks;

in response to delaying execution of the first test case, obtaining a third test case from the plurality of test cases, wherein the third test case causes the software to access a second subset of the data entries;

attempting to acquire a second subset of the locks that correspond to the second subset of the data entries; and determining when to execute the third test case, wherein the determining involves either: (i) failing to acquire all of the second subset of the locks and responsively delaying execution of the third test case, wherein at least one of the second subset of the locks has been acquired by the second test case, or (ii) successfully acquiring all of the second subset of the locks and responsively executing the third test case in parallel with the second test case.

15. The computer-implemented method of claim 12, comprising:

prior to testing the software in parallel, (i) beginning serial execution of the first test case, and (ii) during the serial execution of the first test case, recording all data entries accessed by the software to form the subset of the data entries.

16. The computer-implemented method of claim 15, wherein the serial execution of the first test case causes at least some of the subset of the data entries to change from respective initial states to respective new states, and wherein the computer-implemented method comprises:

after the serial execution of the first test case has ended, reverting the data entries that have changed from their respective new states to their respective initial states.

17. The computer-implemented method of claim 12, wherein causing the software to access the subset of the data entries comprises the software reading from or writing to each of the subset of the data entries, such that the locks facilitate exclusive read and write access the plurality of data entries.

18. An article of manufacture including a non-transitory computer-readable medium, having stored thereon program instructions that, upon execution by a computing device, cause the computing device to perform operations comprising:

obtaining a first test case from a plurality of test cases, wherein a software is configured to operate in a testbed environment and has access to a plurality of data entries, wherein the computing device is configured to test the software in parallel, wherein the first test case causes the software to access a subset of the data entries, and wherein a plurality of locks respectively facilitate exclusive access to the plurality of data entries, one lock per entry;

attempting to acquire a subset of the locks that correspond to the subset of the data entries; and determining when to execute the first test case based on whether all of the subset of the locks have been acquired, and wherein at least one of the subset of the locks has been acquired by a second test case from the plurality of test cases; and executing the first test case in parallel with the second test case in response to acquiring all of the subset of locks have been acquired.

19. The article of manufacture of claim 18, wherein the operations comprise:

delaying execution of the first test case in response to failing to acquire all of the subset of locks;

after delaying execution of the first test case, obtaining the first test case;

attempting to acquire the subset of the locks; and successfully acquiring all of the subset of the locks and responsively executing the first test case.

20. The article of manufacture of claim 18, where the operations comprise:

delaying execution of the first test case in response to failing to acquire all of the subset of locks;

obtaining a third test case from the plurality of test cases, wherein the third test case causes the software to access a second subset of the data entries;

attempting to acquire a second subset of the locks that correspond to the second subset of the data entries; and determining when to execute the third test case, wherein the determining involves either: (i) failing to acquire all of the second subset of the locks and responsively delaying execution of the third test case, wherein at least one of the second subset of the locks has been acquired by the second test case, or (ii) successfully acquiring all of the second subset of the locks and responsively executing the third test case in parallel with the second test case.

* * * * *